United States Patent [19]
Gabriel

[11] 4,095,316
[45] Jun. 20, 1978

[54] CARABINER

[75] Inventor: Günther Gabriel, Gauting near Munich, Germany

[73] Assignee: Salewa Sportperatefabrik mit beschrankter Haftung, Munich, Germany

[21] Appl. No.: 828,860

[22] Filed: Aug. 29, 1977

Related U.S. Application Data

[63] Continuation of Ser. No. 762,760, Jan. 26, 1977.

[30] Foreign Application Priority Data

Feb. 26, 1976 Germany ............................ 2607886

[51] Int. Cl.² ............................................. A44B 13/02
[52] U.S. Cl. .................... 24/234; 24/232 G; 24/231
[58] Field of Search .................. 24/234, 233, 241 S, 24/241 SP, 232, 231; 59/89

[56] References Cited

U.S. PATENT DOCUMENTS

| 76,517 | 4/1868 | Pelton | 24/241 SP |
| 3,563,430 | 2/1971 | Forrest | 24/233 |

FOREIGN PATENT DOCUMENTS 2,060,668   5/1971   France ............................... 24/234

Primary Examiner—Bernard A. Gelak
Attorney, Agent, or Firm—Hans Berman

[57] ABSTRACT

A carabiner consisting of a C-shaped, elongated body member and an elongated closure member pivotally movable on one longitudinally terminal portion of the body member toward and away from a closing position in which both members jointly constitute a closed loop. The body portion is made from a tubular blank whose relatively heavy-walled end portions are of smaller diameter than the thinner-walled central portion. The longitudinally terminal portions of the body member are shaped by flattening the reduced end portions of the blank so that these terminal portions need not be machined to provide the necessary smooth internal contour of the closed carabiner.

8 Claims, 2 Drawing Figures

CARABINER

This is a continuation of application Ser. No. 762,760, filed Jan. 26, 1977.

This invention relates to mountaineering equipment, and particularly to an improved carabiner of tubular metallic material.

A carabiner is a snap link used for movably securing a climbing rope to a support or to a person or an object to be secured by the rope. The rope is passed slidably through the central aperture of the loop defined by the carabiner in the closed position of the same, and may be released from the carabiner by opening the loop. A carabiner normally has a C-shaped body member and a closure member pivotally mounted on a longitudinally terminal portion of the C-shape for closing the gap in the latter in the closed position of the carabiner.

Metal tubing is the preferred material of construction for the body member. The metal tubing is flattened in the longitudinally terminal portions of the blank for the body member, and one end portion of the elongated closure member is pivoted to one of the flattened terminal portions while cooperating abutments on the other end portion of the closure member and the other terminal portion of the body member limit the swinging movement of the closure member to the gap closing position of the latter.

Flattening widens the longitudinally terminal portions of the blank for the body member. In the closed carabiner, at least the inner contour must be smooth to avoid snagging of the sliding rope, and it is necessary to remove the excess width of the flattened terminal body member portions, a procedure which is relatively costly and weakens a critically important part of the conventional carabiner. Otherwise unnecessary oversized tubing may have to be used to provide a desired, load-bearing capability to this weakest part.

It is an important object of this invention to provide a carabiner of tubular metallic material in which the terminal portions of the body member are at least as strong as the remainder of the body member.

A concomitant object is the provision of a carabiner which has a smooth internal contour without requiring removal of metal from the body member after shaping of the same from a tubular blank.

With these and other objects in view, the carabiner of the invention includes an elongated body member of tubular metallic material which is approximately C-shaped so as to have two bight portions connected by an approximately straight portion, and two longitudinally terminal portions respectively extending from the bight portions toward one another and defining a gap therebetween. The wall thickness of the tubular metallic material in the terminal portions is greater than in the bight and straight portions. One of the first and second longitudinal end portions of an elongated closure member is pivotally secured to one of the terminal portions for arcuate movement of the other end portion toward and away from the other terminal portion of the body member. Cooperating abutments on the other end portion and the other terminal portion may be engaged to limit the arcuate movement in a position of the closure member in which the closure member closes the gap in the body member.

Because of the increased wall thickness of the terminal portions of the body member, they may be made from tubing sections of reduced diameter so that the inner contour of the loop defined by the members of the closed carabiner is smooth, the portions of the inner contour defined by the closure member being at least approximately flush with the portions of the inner contour defined by the body member.

Other features, additional objects, and many of the attendant advantages of this invention will readily be appreciated as the same becomes better understood by reference to the following detailed description of a preferred embodiment when considered in connection with the appended drawing in which.

Figure 1:
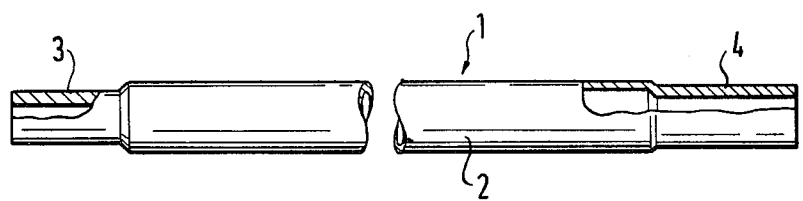
FIG. 1 shows a tubular blank in fragmentary, partly sectional elevation.

Referring initially to FIG. 1, there is shown a straight, tubular blank 1 of high-strength aluminum alloy. The blank 1 has a central portion 2 which is cylindrical and of uniform, circular cross section and wall thickness. The two axially terminal, cylindrical portions 3, 4 of the blank were shaped by upsetting and thereafter roller-forming an initially uniform pipe. The terminal portion 4 has a thicker wall than the central portion 2 and is smaller in outer diameter. The wall thickness of the terminal portion 3 is greater than that of the portion 4, while its outer diameter and axial length are smaller. However, the cross-sectional areas of the three blank portions are substantially the same.

Figure 2:
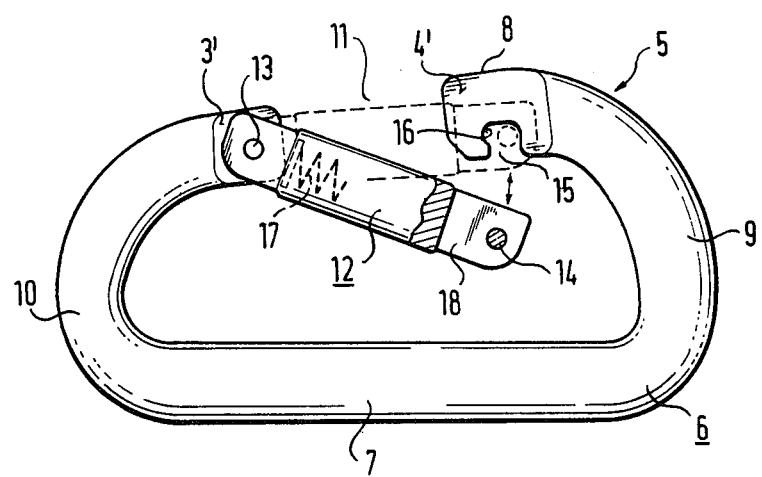
FIG. 2 illustrates a carabiner of the invention whose body member was made from the blank of FIG. 1 in plan view, partly in section.

The carabiner 5 shown in FIG. 2 includes a body member 6 made from the blank 1 and having an approximate C-shape. The terminal portions 3, 4 of the blank were squeezed flat without change in cross-sectional area to constitute terminal portions 3', 4' of the C-shape produced by suitably bending the central blank portion 2 into two bight portions 9, 10 connected by an approximately straight portion 7.

The terminal portions 3', 4' respectively extend from the bight portions 9, 10 toward one another and define a gap 11 therebetween. The gap may be closed by a straight closure member 12 of aluminum alloy bar stock. The two end portions of the closure member 12 are slotted in a common plane, and their slots respectively receive the flattened terminal portions 3', 4' in the closing position of the member 12 indicated in broken lines. One end portion of the closure member 12 is pivotally attached to the associated terminal portion 3' by a pivot pin 13. An abutment pin 14 fixedly connecting the walls 18 of the slot in the other end portion of the closure member 12 abuts against the terminal portion 4' in a notch 15 of the latter in the closing position of the member 12.

A spring 17 biases the member 12 toward the closing position, but the strong pressure of an applied finger may overcome the spring for moving the member 12 inward of the loop defined by the closed carabiner into the fully drawn position and further for release of a rope from the carabiner, the arcuate movement of the pin 14 and of the associated end portion of the member 12 being indicated by a curved arrow. Normal loading of the closed carabiner 5 expands the body portion 6 so that the pin 14 is received in an undercut 16 of the terminal portion 4' and secures the carabiner against accidental opening.

The terminal portion 3' of the body member 6 is made of the end portion 3 of the blank 1 whose diameter is smallest and whose wall thickness is greatest. When the blank portion 3 is squeezed flat, its cross section is elongated parallel to the plane of FIG. 2, and to the plane of symmetry of the carabiner 5. The width of the terminal portion 3' in the last-mentioned plane is approximately equal to that of the adjacent end of the thinner-walled bight portion 10 and approximately equal to the corresponding dimension of the closure member 12.

The surface of the closed carabiner 5 intersects the plane of symmetry of the carabiner in inner and outer closed loops separated by the widths of the body and closure members. The pivot pin 13 and the abutment pin 14 are located so that the inner loop is smooth, the portion of the inner loop defined by the closure member 12 being approximately flush with the portion of the inner loop defined by the body member.

This flush configuration at the terminal portion 4' is brought about by making the notch 15 of suitable depth. Because the blank portion 4 is thinner-walled and greater in diameter than the blank portion 3, the terminal portion 4' of the body member 6 is wider in the plane of carabiner symmetry than the terminal portion 3'. The inner loop of the carabiner being flush, the portion 8 of the outer loop defined by the terminal portion 4' projects beyond the closed closure member 12. The carabiner may be opened with one hand without loss of safety by abutting the projecting terminal portion 4' against the edge of a rock or other available stationary object and moving the closure member 12 inward of the central aperture of the carabiner with one finger.

In the illustrated body member 6, the straight portion 7 has the circular cross section of the central blank portion 2. The cross sections of the bight portions are not exactly circular because of slight deformation during bending. However, it may be preferred to compress the straight and bight portions so that their cross sections are elongated in the plane of symmetry for greater bending resistance. This may require minor adjustments in the wall thicknesses and outer diameters of the end portions in the blank without affecting the basic relationships of these parameters. It is essential that the wall thickness of the flattened, tubular terminal portions 3', 4' remain greater than that of other portions of the body member, and that the parts of the wall constituting the narrow edges of the flattened terminal portions 3',4' not be weakened unduly. The notch 15 is limited to a short longitudinal section of the terminal portion 4' and has only a minor effect on the strength of the portion 4'.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A carabiner comprising:
   (a) an elongated body member of tubular metallic material,
      (1) said body member being approximately C-shaped, having two bight portions connected by an approximately straight portion, and two longitudinally terminal portions respectively extending from said bight portions toward one another and defining a gap therebetween,
      (2) the wall thickness of said metallic material in said terminal portions being greater than in said bight and straight portions;
   (b) an elongated closure member having first and second longitudinal end portions, one of said end portions being pivotally secured to one of said terminal portions for arcuate movement of the other end portion toward and away from the other terminal portion; and
   (c) cooperating abutment means on said other end portion and said other terminal portion engageable for limiting said arcuate movement in a position of said closure member in which said closure member closes said gap,
      (1) the wall thickness of said metallic material in said one terminal portion being greater than the corresponding thickness in said other terminal portion.

2. A carabiner as set forth in claim 1, wherein said body member and said closure member are elongated substantially in a common plane, and the cross section of each of said terminal portions is elongated in said plane.

3. A carabiner as set forth in claim 2, wherein said body member and said closure member jointly constitute a closed loop in said plane in said position of the closure member, the transverse width of said first end portion in said plane being approximately equal to the corresponding dimension of the associated terminal portion.

4. A carabiner as set forth in claim 2, wherein said body member and said closure member jointly define an outer loop and an inner loop in said plane in said position of the closure member, said loops being separated in said plane by the respective widths of said members, the portion of said inner loop defined by said closure member being at least approximately flush with the portion of said inner loop defined by said body member.

5. A carabiner as set forth in claim 4, wherein the portion of said outer loop defined by said first end portion is at least approximately flush with the portion of said outer loop defined by said body member, and the portion of said outer loop defined by said other terminal portion projects beyond the portion of said outer loop defined by said closure member.

6. A carabiner as set forth in claim 2, wherein said end portions are formed with respective slots in said plane, said slots respectively receiving said terminal portions in said position of the closure member.

7. A carabiner as set forth in claim 2, wherein said body member and said closure member jointly constitute a closed loop in said plane in said position of the closure member, said abutment means preventing arcuate movement of said closure member outward of said loop.

8. A carabiner as set forth in claim 2, wherein the cross-sectional areas of said terminal portions and of said straight portion are substantially equal.

* * * * *